United States Patent [19]

Sagawa et al.

[11] 4,347,201
[45] Aug. 31, 1982

[54] PROCESS AND APPARATUS FOR PRODUCING A TEMPERATURE SENSITIVE ELEMENT

[75] Inventors: Masato Sagawa; Wataru Yamagishi, both of Yokohama, Japan

[73] Assignee: Fujitsu Limited, Kawasaki, Japan

[21] Appl. No.: 89,737

[22] Filed: Oct. 31, 1979

[30] Foreign Application Priority Data

Nov. 4, 1978 [JP] Japan ................. 53-135149

[51] Int. Cl.³ ............................................. C04B 35/50
[52] U.S. Cl. ....................... 264/24; 148/103; 264/65; 264/85; 264/332; 264/DIG. 58; 425/3
[58] Field of Search ............... 264/24, DIG. 58, 332, 264/65, 85; 425/3; 29/608; 148/103, 104

[56] References Cited

U.S. PATENT DOCUMENTS

| | | | |
|---|---|---|---|
| 2,247,376 | 7/1941 | Heuer | 264/24 |
| 2,384,215 | 9/1945 | Toulmin | 264/DIG. 58 |
| 3,264,716 | 8/1966 | Silver | 264/24 |
| 3,387,066 | 6/1968 | Martin et al. | 264/24 |
| 3,855,374 | 12/1974 | Brailowsky et al. | 264/24 |
| 3,891,476 | 6/1975 | Naastepad | 148/103 |
| 3,977,918 | 8/1976 | Paladino | 148/103 X |
| 4,057,606 | 11/1977 | Kobayashi et al. | 264/24 |
| 4,063,970 | 12/1977 | Steingroever | 264/24 |
| 4,156,623 | 5/1979 | Becker | 148/103 |

Primary Examiner—Thomas P. Pavelko
Attorney, Agent, or Firm—Staas & Halsey

[57] ABSTRACT

A temperature sensitive element comprises fine grain powders which consist of a spin reorientation type ferromagnetic material having a transition temperature range, below which transition temperature range the easy direction of magnetization of the spin reorientation type ferromagnetic material is predetermined in one crystallographic direction thereof and above which transition temperature range the easy direction of magnetization is a predetermined other direction perpendicular to the predetermined one crystallographic direction. The temperature sensitive element is produced by compacting the fine grain powders of a spin reorientation type ferromagnetic material at a temperature higher than the transition temperature range. A polycrystalline rare earth cobalt alloy material made in accordance with the invention can now be used in the field where low Curie point ferrite or where bimetals have been used previously for a thermal valve or a temperature controlling device.

4 Claims, 18 Drawing Figures

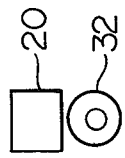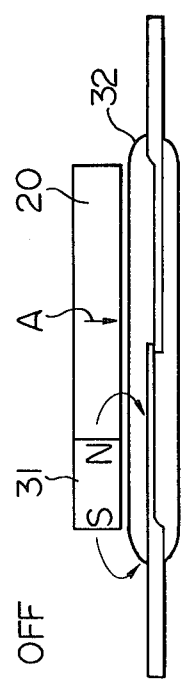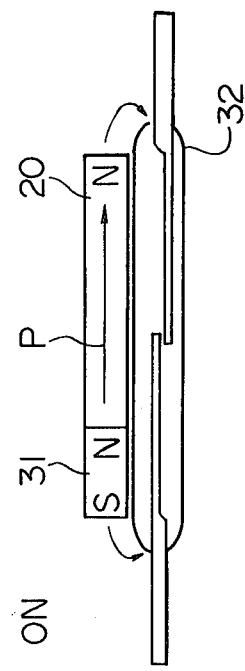
Fig. 13B
Fig. 13A
Fig. 13C

PROCESS AND APPARATUS FOR PRODUCING A TEMPERATURE SENSITIVE ELEMENT

The present invention relates to a process for producing a magnetic body that includes a process for compacting fine powders of a ferromagnetic material, and more particularly to a novel process for producing a temperature sensitive element by means of the compacting process from a ferromagnetic material, in which the temperature dependence of the ferromagnetic material is utilized for the sensing of temperature.

It is well known that, in ferromagnetic materials, a large amount of magnetic anisotropy may be present and that the easy direction of magnetization of several ferromagnetic materials is reoriented depending upon temperature. Rare earth cobalt alloy materials, such as $PrCo_5$, $NdCo_5$, $TbCo_5$, $DyCo_5$, $HoCo_5$, $Lu_2Co_{17}$, $Tm_2(Fe_{1-x}Co_x)_{17}$ and so forth, are typical ferromagnetic materials in which the easy direction of magnetization is reoriented. The easy direction of magnetization of the rare earth cobalt alloy materials used as a permanent magnet is directed along the A axes at 0° K. or higher. On the other hand, a ferromagnetic material which has an easy direction of magnetization at basal planes (p) or conical planes (c) of crystals thereof at 0° K. or higher is not suitable for use as the permanent magnet. The present invention is related to the development of the use of a ferromagnetic material having an inferior magnetic property at approximately room temperature as a new temperature sensitive element, and is also related to the development of a new process for manufacturing a rare earth cobalt alloy material.

The temperature sensitive element will now be explained. There are a number of apparatuses in which it is necessary to change the quantity or the direction of a fluid by detecting the temperature of the fluid. According to a well known apparatus, the quantity or the direction of the fluid is changed by combining a bimetal element with an electromagnetic valve or by causing an angular displacement of a spirally wound bimetal sheet. However, the electromagnetic valve is very expensive, and electric wiring is needed at a portion between the electromagnetic valve and the device for controlling the quantity and the direction of the fluid. This well known apparatus, therefore, has a disadvantage in that the switching device is very expensive and complicated. An opening and closing temperature of the switching device is often shifted from a predetermined temperature during the continuous use of a bimetal element, since the bimetal operates by using a very small displacement due to a thermal expansion thereof.

Instead of the bimetal, a temperature sensitive element which uses a low Curie point ferrite has recently become popular. In this temperature sensitive element, the property that the ferrite changes into a non-magnetic material at a temperature over the Curie point is utilized. However, since an external magnetic flux is liable to permeate through the ferrite magnetic body over the Curie point in this type of temperature sensitive element, the flow direction of the external magnetic flux is caused to change at around the Curie point. Because of the change in the flow direction it is possible to make and break a switch coupled with the temperature sensitive element. Such a switching device has a disadvantageously large size because the magnetic property, particularly, the saturation magnetization of the ferrite, is relatively low. Furthermore, since the ferrite utilizes the disappearance of the ferromagnetic property as aforementioned, only a limited operation, such as the opening and closing of the switch, is possible and neither a rotational movement of the valve nor a continuous adjustment of fluid quantity is possible.

The conventional production process of a rare earth cobalt alloy material will now be explained. The rare earth cobalt alloy material used as a permanent magnet has the property that the A axis direction becomes an easy direction of magnetization from 0° K. as mentioned above. The material having the property mentioned above, for example $SmCo_5$, is pressed under a magnetic field to obtain a high remanence and high energy product required for a permanent magnet. Considering the fact that the temperature sensitive material, like a ferrite, must possess a magnetic property which varies depending upon temperature, the rare earth cobalt alloy material suitable for the permanent magnet cannot be used as the temperature sensitive material. This is because the stable magnetic property, which makes the rare earth cobalt alloy material suitable for the permanent magnet, does not vary depending upon temperature.

The liquid phase growth process, which is one of the processes for producing a rare earth cobalt alloy material, will now be explained. In this process, a single crystal of the rare earth cobalt alloy material is grown by cooling the melt of this material for a long period of time. The single crystal has a uniformly oriented A axis direction. However, the liquid phase growth process cannot be practically used for industrial purposes because the process requires a very long time to complete.

It is, therefore, an object of the present invention to provide a ferromagnetic body having a temperature-sensitive property by a process for producing a ferromagnetic material that includes a process for compacting ferromagnetic material powders in a magnetic field.

It is another object of the present invention to provide a process for producing a polycrystalline temperature sensitive material.

It is still another object of the present invention to provide a powder compacting apparatus for carrying out the above mentioned processes.

In a process for producing a ferromagnetic body comprising a step for compacting fine grain powders of a ferromagnetic material under a magnetic field, the present invention comprises:

heating in the compacting step fine grain powders which consist of a spin reorientation type ferromagnetic material to a temperature higher than a transition temperature range, below which transition temperature range the easy direction of magnetization is parallel to a predetermined one crystallographic direction of the spin reorientation type ferromagnetic material and above which transition temperature range the easy direction of magnetization is parallel to a predetermined other direction perpendicular to said one direction of the crystals, and;

producing from the compacted ferromagnetic material a temperature sensitive element, in which the easy direction of magnetization is reoriented at the transition temperature range.

The C axis direction of the ferromagnetic material, which is preferably one crystallographic direction as mentioned above, is not oriented by the ordinary pressing process (i.e., a process carried out under a magnetic field at room temperature so as to produce a permanent magnet). An important feature of the present invention is, therefore, to uniformly orient the easy direction of magnetization by means of a powder compacting process at a temperature above the transition temperature range. A ferromagnetic material, typically a rare earth cobalt alloy material, in which the easy direction of magnetization is variable depending upon temperature, is referred to as a spin reorientation type ferromagnetic material.

The present invention is characterized by using the spin reorientation type ferromagnetic material because the coercive force is low and, further, because the easy direction of magnetization is variable, so that the easy direction of magnetization is parallel to the crystal basal planes (p) and the A axes at a temperature below and above the transition temperature range, respectively. Of course, this type of material is not suitable for a permanent magnet.

An apparatus for carrying out the present invention comprises: (A) means for compacting fine grain powders; (B) means for applying a magnetic field to the powders being compacted, and; (C) means for heating the powders being compacted. The heating means surrounded the compacting means for homogeneously heating the fine grain powders being compacted and consists of a non-magnetic material so as not to disturb the direction of the magnetic field applying by the magnetic field generating means. The terms "pressing" and "compacting" used herein indicate the process for producing a green compact from powders and are used in the ordinary terminology of powder metallurgy.

The rare earth cobalt material is generally expressed by a formula of $R_nCo_m$, wherein R is one or more rare earth elements and Co consists of cobalt or is a composition mainly composed of cobalt, and additionally, iron, copper, vanadium and other additive metals, which partly replace cobalt. The ratio of m to n may range from 3.5 to 8.5.

The embodiments of the present invention will be explained hereinafter with reference to the drawings wherein.

Figure 4B:
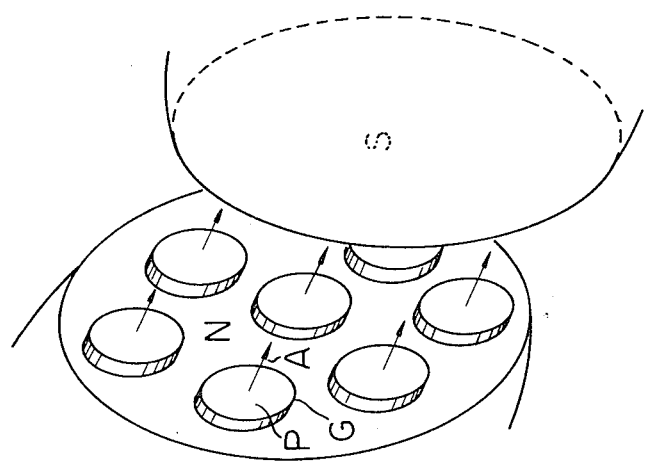
Figure 4A:
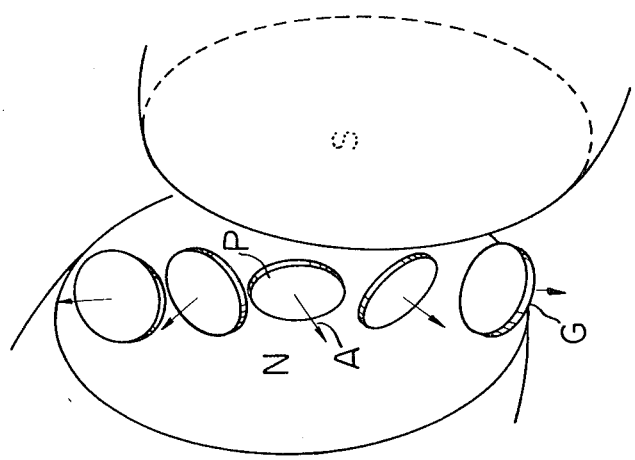

FIGS. 4 A and B are schematic views illustration the orientation of fine grain powders of a ferromagnetic material.

Figure 5:
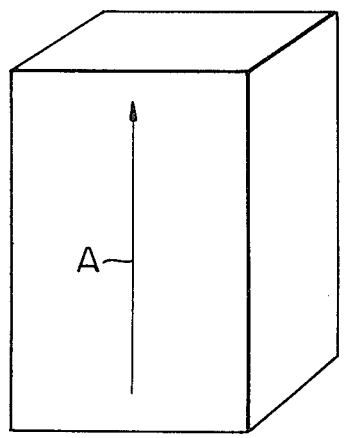
Figure 6:
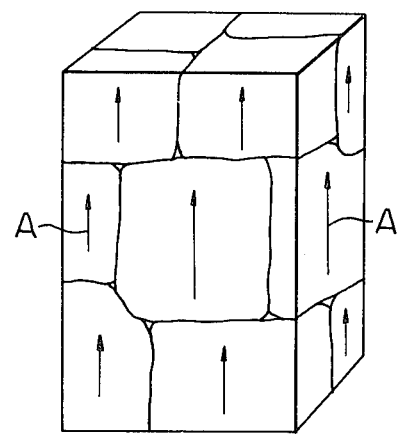
Figure 7:
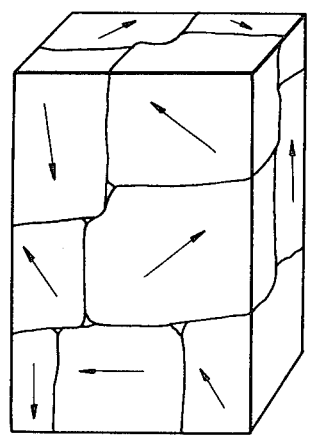
Figure 8:
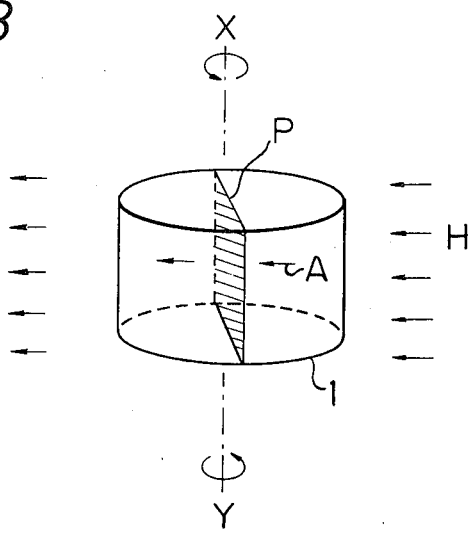
Figure 9:
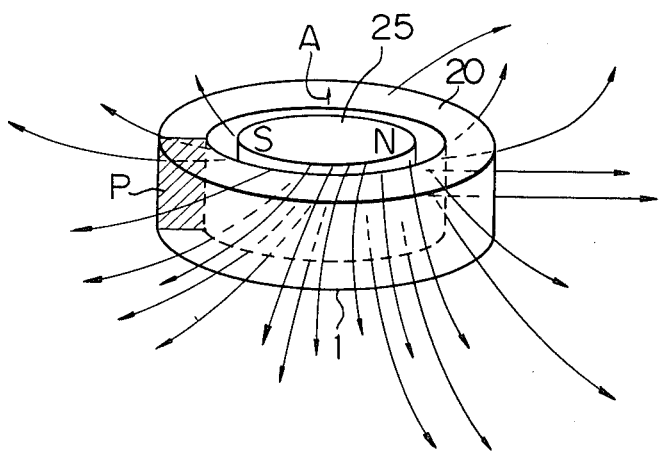
Figure 10:
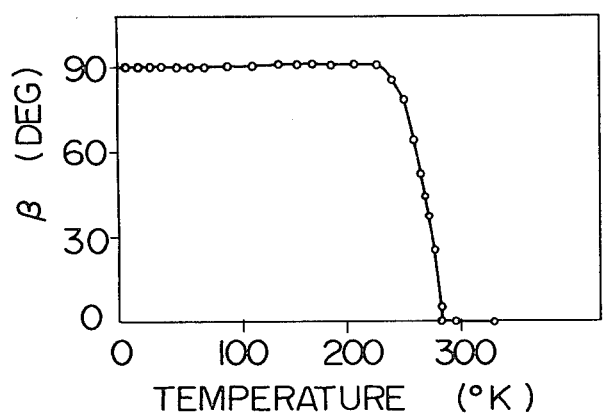
Figure 11:
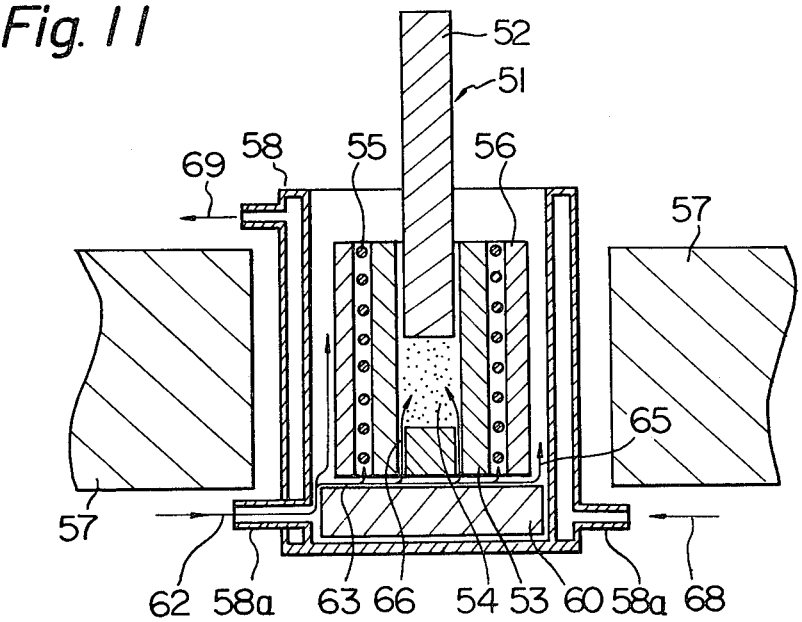
Figure 12:
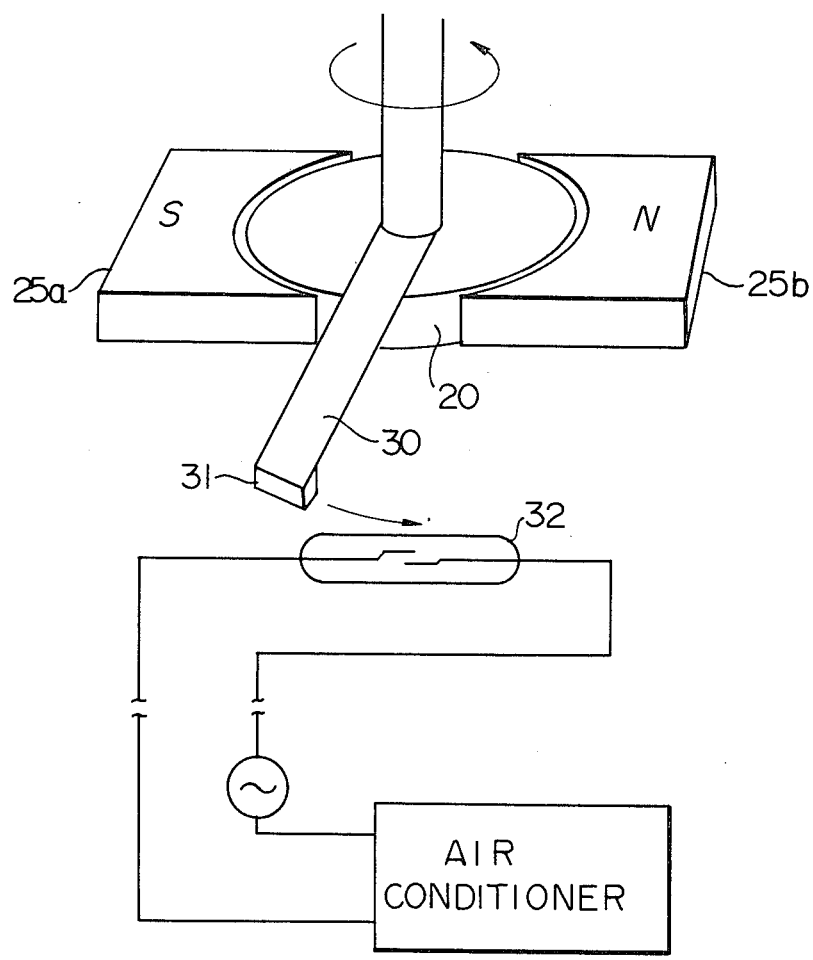
Figure 14:
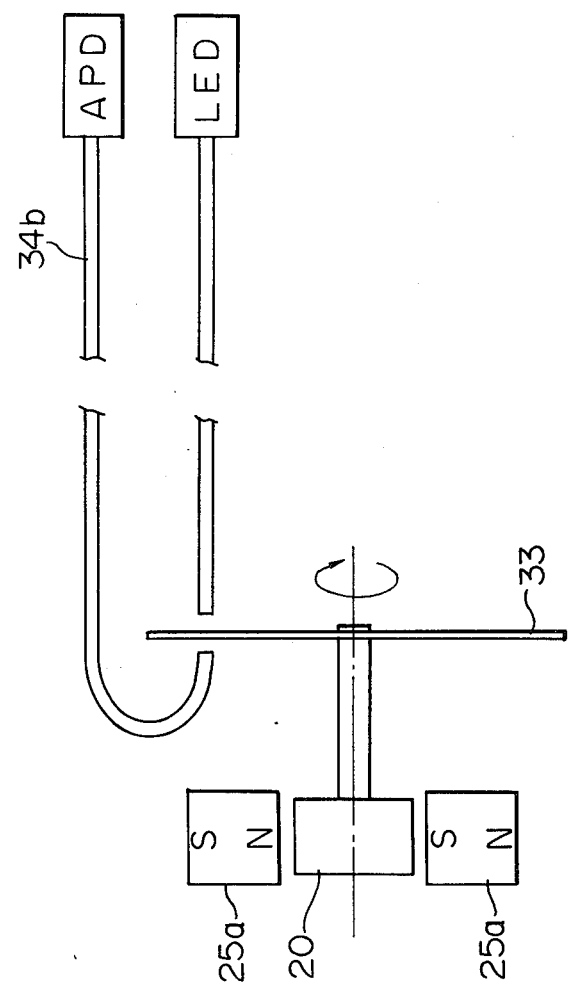
Figure 15:
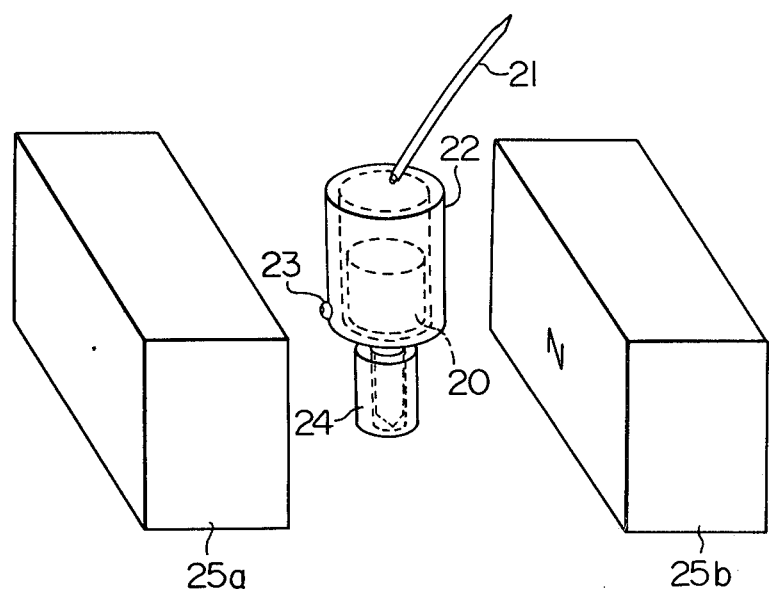

FIG. 5 is a schematic view illustrating a single crystal of a rare earth cobalt alloy material having an A axis of easy magnetization produced by a conventional process;

FIG. 6 is a schematic view of polycrystals of a rare earth cobalt alloy material with an A axis of easy magnetization in single orientation produced by the process of the present invention;

FIG. 7 is a schematic view of a polycrystal of a rare earth cobalt alloy material with an A axis of easy magnetization in random orientation produced by a conventional process;

FIGS. 8 and 9 are schematic views illustrating the relationship between the easy direction of magnetization (A) of the ferromagnetic material and the rotation of the temperature sensitive ferromagnetic material disc;

FIG. 10 is a graph showing the temperature dependence of the easy direction of magnetization of a rare earth cobalt alloy material;

FIG. 11 is a cross sectional view of an embodiment of a powder compacting apparatus according to the present invention;

FIG. 12 is a schematic view of a device using a temperature sensitive ferromagnetic material for controlling the temperature of an air conditioner;

FIGS. 13 A to C are views of reed switches, wherein, A is a front view of a closed reed switch, B is a side view of the reed switch of FIG. 13 A, and C is a front view of an opened reed switch;

FIG. 14 is a schematic view of another temperature sensing device, and;

FIG. 15 is a perspective view of a device for performing a rotating test of temperature sensitive materials made in accordance with the invention.

Figure 1:
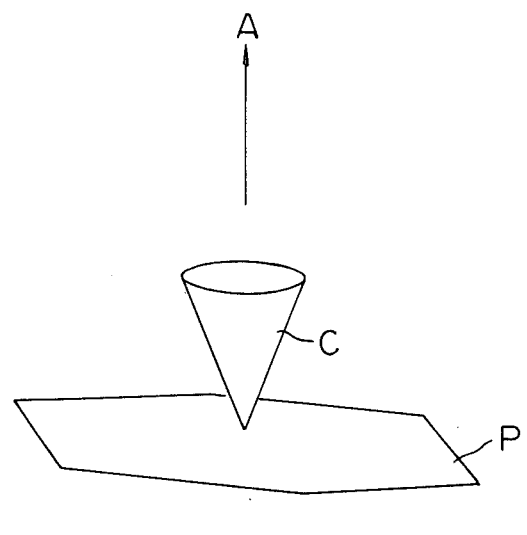
FIG. 1 illustrates a crystal structure and the easy direction of magnetization of an $RCo_5$ type rare earth cobalt alloy material, wherein the symbols ● and O indicate R and Co atoms, respectively.
Figure 1:
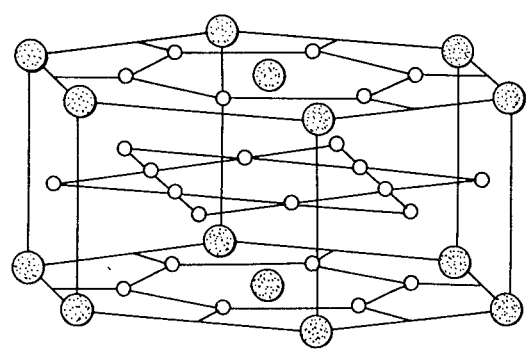

FIG. 1 illustrates the crystal structure and an easy direction of magnetization of a hexagonal $RCo_5$ type rare earth cobalt alloy material. The symbols ● and O indicate the rare earth element and the cobalt element, respectively. In the material used as a permanent magnet, the magnetic anisotropy and, thus, the magnetic anisotropy constant are extremely large, and the axis of the crystal denoted by A (abbreviation of axis) in FIG. 1 is generally the easy axis of magnetization.

Magnetization may not be saturated in the difficult direction of magnetization, unless a magnetic field in an amount of a few hundred KOe is applied to such direction. When the R component and the kind or quantity of the replacing amount of the Co component are varied, the axis of easy direction of magnetization may be moved from the A axis to the basal plane P (an abbreviation of plane) or to the cone plane C (an abbreviation of cone) in accordance with temperature.

The $R_2Co_{17}$ type rare earth cobalt alloy material exhibits a hexagonal or rhombohedron structure depending upon the composition and temperature. The $R_2Co_{17}$ type rare earth cobalt alloy material exhibits a temperature dependence on magnetic anisotropy, in which either the A axis, the basal plane P or the cone plane C is the axis of easy direction of magnetization.

Figure 2:
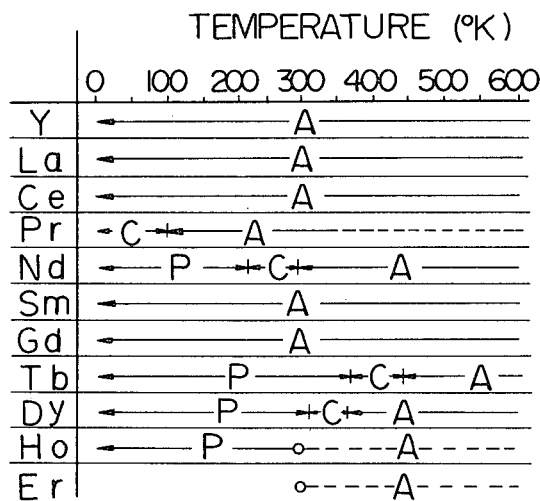
FIG. 2 is a graph showing a temperature dependence of the easy direction of magnetization of an $RCo_5$ type rare earth cobalt alloy material.
Figure 3:
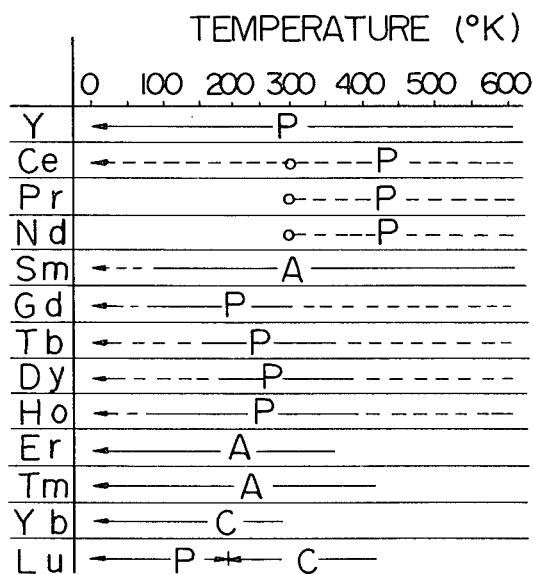
FIG. 3 is a graph showing the temperature dependence of the easy direction of magnetization of an $R_2Co_{17}$ type rare earth cobalt alloy material.

The variance of the easy direction of magnetization of the $RCo_5$ type and $R_2Co_{17}$ type rare earth cobalt alloy materials illustrated in FIGS. 2 and 3, respectively is based upon the Bulletin of The Japan Institute of Metals, Volume 16, No. 2(1977), page 79. In FIGS. 2 and 3, the symbols A, C and P have the meaning as explained above. The broken lines in FIGS. 2 and 3 denote the undetermined or presumed direction mentioned above.

In the case of the $RCo_5$ type rare earth cobalt alloy material shown in FIG. 2, the easy direction of magnetization exhibits a temperature dependence, when the rare earth element is praseodymium (Pr), neodymium (Nd), terbium (Tb), dysprosium (Dy) or holmium (Ho). The $R_2Co_{17}$ type rare earth cobalt alloy material shown in FIG. 3 exhibits a temperature dependence when the rare earth element is Lu.

It is therefore possible, by selecting different kinds of rare earth elements, to adjust the reorientation temperature of the easy direction of magnetization.

Accordingly, it is possible to select a desired switching temperature of the valve and the like. For the $RCo_5$ type material shown in FIG. 2, the transition temperatures of $NdCo_5$, $TbCo_5$, and $DyCo_5$ are approximately 300° K., 450° K., and 370° K., respectively. Since the switching temperature or the controlling temperature of the flow rate of a fluid substantially corresponds to the transition temperature range, the composition of the spin reorientation type materials should be selected in light of the switching or controlling temperatures. In other words, the composition of the spin reorientation type materials is the only requirement for determining the transition temperature range and switching temperature.

The $R_2Co_{17}$ type materials shown in FIG. 3 cannot be used in the present invention unless an additive element is incorporated with the material. Namely, when an additive metal, such as copper, iron and vanadium, is incorporated with the $R_2Co_{17}$ rare earth cobalt alloy type material, such material has an adjustable transition temperature range.

Examples of the easy direction of magnetization of the $R_2Co_{17}$ material are listed in the table below, with MM representing a misch metal. The easy direction of magnetization of the $R_2Co_{17}$ type rare earth cobalt alloy material at room temperature varies due to the replacement of cobalt with iron.

| X | \multicolumn{6}{c}{R} |
|---|---|---|---|---|---|---|
|   | Ce | Pr | Nd | Sm | Y | MM |
| 0.0 | P | P | P | A | P | P |
| 0.1 | A | P | P | ND | A | A |
| 0.2 | A | A | P | ND | ND | A |
| 0.25 | ND | A | ND | ND | ND | A |
| 0.3 | A | A | P | ND | A | A |
| 0.4 | A | A | P | A | A | A |
| 0.5 | P | A | P | A | A | P |
| 0.6 | P | A | ND | P | P | ND |
| 0.7 | P | P | P | P | P | ND |
| 0.75 | ND | P | P | ND | P | P |
| 0.8 | ND | P | P | P | P | ND |
| 0.9 | P | — | — | P | — | — |
| 1.0 | P | P | P | P | P | P |

In the above table, the parameter "x" indicates the molar ratio of the Fe replacement in the formula of $R_2(Co_{1-x}Fe_x)_{17}$ and "ND" indicates that the easy direction of magnetization is not yet determined.

The process for manufacturing the temperature sensitive element of the present invention will now be explained in detail.

Although a permanent magnet can be produced by a compacting process of pressing powders in a magnetic field, powders are subjected to a pressing in a magnetic field at a temperature greater than the transistion temperature range according to a feature of the present invention for producing a temperature sensitive element. The direction of magnetization of the finely powdered spin reorientation type ferromagnetic material can be uniformly oriented at the temperature of pressing in the magnetic field. Accordingly, the direction of magnetization can be satisfactorily oriented into a uniform direction at a temperature slightly exceeding the transition temperature range. In this regard, the pressing temperature is preferably 20° C. higher than the transition temperature range. It is not economical to elevate the pressing temperature any higher than that slightly exceeding transition temperature range. Moreover, carrying out the powder compacting at a temperature of more than 150° C. (425° K.) is not advisable because the powders are liable to burn. Generally speaking, the pressure of the pressing in the magnetic field is from 0.5 to 10 t/cm² and the magnetic field is 1 to 15 KOe. Besides the step of compacting or pressing the powder with heating, the other steps used for producing the temperature sensitive element can be known processes for producing the permanent magnet, such as a sintering step and a solidification of powders by means of a low melting point metal or a resin.

A series of processes for producing a temperature sensitive ferromagnetic body will be explained hereinafter.

Starting materials are arc-melted or induction-melted in an inert gas atmosphere, at a temperature of from 1300° to 1500° C. Then, the obtained ingot is finely divided into fine grain powders of single magnetic domain, which are then compacted. The powder compacting is carried out at a temperature higher than the transition temperature range, while the direction of magnetization of the fine grain powders is uniformly oriented by applying a magnetic field to the fine grain powders. It is to be noted that, since the easy direction of magnetization is a direction parallel to the basal planes at a temperature lower than the transition temperature range, only the basal planes (P) of the fine grain powders (G) are oriented in the direction of the magnetic field at a temperature lower than the transition temperature range. At such lower temperatures the A axes are not oriented in the direction of the magnetic field generated by the magnets having N and S poles. However, since the pressing is performed in the magnetic field at a temperature higher than the transition temperature range, according to the present invention, the basal planes (P) and the A axes of the fine grain powders (G) are oriented in a direction perpendicular and parallel to the direction of the magnetic field, respectively, as shown in FIG. 4B, with the result that the desired orientation of the fine grain powders is attained. More specifically, in an ordinary polycrystalline green compact (FIG. 7), the direction of the A axes are random. Even if this green compact is produced at a compacting temperature below the transition temperature range, the directions of the A axes are not uniformly oriented. Contrary to this, the polycrystalline spin reorientation type material subjected to the simple method according to the present invention exhibits single-axial anisotropy, as shown in FIG. 6. Although in the single crystal shown in FIG. 5 produced by the liquid phase growth process, the direction of the A axis is uniformly oriented, an impractical long time is necessary to produce the single crystal.

Subsequent to the compacting step, the sintering and heat treatment steps are carried out at an elevated temperature of 1000° C. or more.

It is possible to use a process of direct reduction of rare earth alloy raw material by calcium instead of the melting process mentioned above. Further it is also possible to use, instead of a sintering process, a process for incorporating a resin or a low melting point metal into the green compact of powders of rare earth cobalt alloy material, thereby providing the green compact with the stiffness and dimensional stability required.

By using the spin reorientation type ferromagnetic material produced by the above mentioned process, it is possible to provide a novel switching method for a valve and the like. In this method, a magnetic field is applied from generating means of the magnetic field to a temperature sensitive means comprising the spin reorientation type ferromagnetic material, which is hereinafter referred to as a temperature sensitive ferromagnetic material. One of the temperature sensitive means and the means for generating the magnetic field is rotated around the other at a predetermined temperature, thereby switching the valve due to the driving force generated by the rotation.

The present inventors calculated that, when the temperature sensitive ferromagnetic material is a rare earth cobalt alloy material, 1 kg.cm and more of rotary torque is generated at a volume of 1 cm$^3$ of the rare earth cobalt alloy material. The rare earth cobalt alloy material is, therefore, a particularly preferable temperature sensitive ferromagnetic material capable of exactly switching a valve and the like.

The relationship between the change of easy direction of magnetization of the temperature sensitive ferromagnetic material and the rotation of a disc made of this material will now be explained based on a discovery by the present inventors and with reference to FIG. 8. Referring to FIG. 8, in the temperature sensitive ferromagnetic material in the form of a disc, (1) the A axes and basal planes (P) of the crystals are uniformly oriented in the directions parallel to the top and bottom flat surfaces of the disc and to the central axis (XY) of the disc. The movement of the disc, respectively (1) is constrained so that the disc is capable of rotating only around the XY axis. The magnetic field (H) is applied to the disc perpendicular to the central axis (XY) prior and subsequently to the rotation of the disc. When the easy direction of magnetization of the temperature sensitive ferromagnetic material is changed from the basal planes (P) to the direction of the A axes, the disc (1) is rotated around the XY axis. When the easy direction of magnetization is reoriented from the direction of the A axes to the basal planes (P), the disc (1) is rotated around the XY axis in the direction opposite to that of the rotation mentioned above. The angle of the rotation is about 90° wherever the easy direction of magnetization is reoriented from the direction of the A axes to the basal planes (P) or from the basal planes (P) to the direction of the A axes. Further, if the positional relationship between the A axes and the basal planes (P) is interchanged from that as shown in FIG. 8, the disc may be rotated in the manner as explained with reference to FIG. 8.

The disc in FIG. 8 is modified in FIG. 9 to a hollow configuration and a magnet (25) is arranged within the hollow space of the disc. Almost all of the lines of magnetic force permeate the hollow disc (20) made of the temperature sensitive ferromagnetic material and the columnar magnet (25) in a direction parallel to the A axes and the basal planes (P) of the magnet (25). It has been proven by the present inventors that one of the hollow discs, i.e. the temperature sensitive means, and the magnet (25), i.e. generating means of the magnetic field, is capable of rotating in accordance with the reorientation of the easy direction of magnetization, provided that at least one of the two means is rotatably mounted.

When the NdCo$_5$ type rare earth cobalt alloy material is selected as the temperature sensitive ferromagnetic material, the disc shown in FIG. 8 rotates as explained hereinafter with reference to FIG. 10. In FIG. 10, the symbol "$\beta$" indicated at the ordinate means the angle between the A axes, i.e. one easy direction of magnetization and the other easy direction of magnetization. As will be understood from the explanation with reference to FIG. 8, the disc (1) rotates by 90° when the reorientation of the easy direction of magnetization amounts to an angle of 90°, namely the easy direction of magnetization changes from the A axes to the basal planes (P) and vice versa. When the NdCo$_5$ type material is used as the temperature sensitive ferromagnetic material, the rotation by an angle of 90° is realized at the transition temperature range between approximately 240° K. and 280° K.

In the non limitative embodiments explained with reference to FIGS. 8 through 10, the rotating driving force is provided by the rotation of a disc or magnet. In another embodiment, the temperature sensitive ferromagnetic material is fixed and a closable switch is made of a ferromagnetic material. The switch is opened and closed by utilizing the reorientation of easy direction of magnetization depending upon temperature and direction of magnetic flux.

The switching technique of the present invention is different from the known switching technique based on ferrite in the fact that the spin reorientation is utilized for the temperature sensing. In addition, the saturation magnetization of the temperature sensitive ferromagnetic material is three times or more higher than that of low Curie point ferrite. Accordingly, the size of the switching apparatus as a whole can be extremely reduced, as compared to that of low Curie point ferrite. In addition, it is easy to provide the switching device with a low controlling temperature, for example from room temperature to 150° C. (423° K.).

An embodiment of the apparatus for compacting powders will now be explained with reference to FIG. 11. In FIG. 11, compacting means (51) is provided consisting of a die (53) and a punch (52) guided by the die. The cavity of the compacting means (51) is filled with the powders of temperature sensitive ferromagnetic material. The powders (54), have a grain size of from 5 to 10 microns and can be crushed, for example, by a jet mill. A pressure for compacting the powder is usually a few tons/cm$^2$. The powders may be subjected to a hydrostatic pressing after pressing by the powder compacting apparatus illustrated in FIG. 11.

A heater comprising Nichrome wires (55) and the like surrounds the compactor die (53) and heats the powders (54), by means of electric resistance heating, to a temperature exceeding the transition temperature range of the temperature sensitive ferromagnetic material. Also provided are magnets (57) for applying a magnetic field to the grain powders (54). A heat-insulating wall (56) made of glass wool is provided so as to coaxially surround the Nichrome wires (55) of the heater and, therefore, prevent the heating of the magnets (57) due to heat generated from the Nichrome wire (55) of the heater. The heat insulating wall can prevent reduction in the magnetic field generated between the magnets. When the heating temperature is relatively low, the heat insulating wall may obviously be omitted. The die (53) and the heat insulating wall (56) are mounted on a heat resistant support (60) made of alumina. The die (53), the wires (55) of the heater, the heat insulating wall (56) and the heat resistant support (60) are coaxially surrounded by the water cooled jacket (58) for preventing the magnets (57) from being oxidized by heat dissipated outwardly through the above mentioned parts (53), (55), (56) and (60) of the compacting device. When the heating temperature is low, the water cooled jacket (58) need not be used. The magnets (57) may be permanent magnets or electromagnets. The magnetic field of from 1 to 10 KOe emanated from one of the magnets permeates the parts (58), (56), (55) and

(53) mentioned above, and is then applied to the powders (54). When the magnetic properties of the powders are liable to change in the air or when the heating temperature of the powders if high, it is preferable to provide a gas inflow pipe (58a) protruding through the water cooled jacket (58) in order to protect the powders with an inert gas or nitrogen gas provided through the pipe (58a). It is also preferable to create the gas flows denoted by the arrows (62) through (69), utilizing the existing or newly formed gaps between the parts of the compacting apparatus.

It is possible to use the polycrystalline temperature sensitive ferromagnetic material, such as rare earth cobalt alloy material, made in accordance with the present invention in the field where low Curie point ferrite has been used or where bimetals have been used for a thermal valve or a temperature controlling device. It is, therefore, possible to achieve by a simple process the advantages of size reduction and performance elevation for a relay device, a thermal valve device and the like. Other advantages will now be explained with reference to FIGS. 12 through 15.

Referring to FIG. 12, the sintered and compacted body (20) formed of a temperature sensitive ferromagnetic material is rotatably arranged at the center of permanent magnets (25a, 25b). A permanent magnet (31) is secured to the end of a strip plate piece (30) which is mounted on the sintered body (20) of temperature sensitive ferromagnetic material and is rotatable around the axis thereof. In the temperature controlling device illustrated in FIG. 12, the permanent magnet (31) is rotated by an angle of 90° when the temperature is changed from a higher temperature to a lower temperature than the transition temperature range and vice versa. A reed switch (32) electrically connected to an air conditioner is arranged in a rotation area of the permanent magnet (31). The reed switch (32) of the air conditioner is turned on and off at a desired temperature by the rotation of the magnet (31). An advantage of the temperature controlling device is that the controlling or desired switching temperature can be easily and precisely changed by means of adjusting the composition of the temperature sensitive ferromagnetic material.

The reed switch (32) disclosed in FIGS. 13 A through C is opened and closed in a manner different from the reed switch shown in FIG. 12. The sintered body (20) of temperature sensitive ferromagnetic material secured to the permanent magnet (31) directs the magnetic field from the permanent magnet so as to close and open the reed pieces of the reed switch (32). In FIG. 13A, the A axes of the sintered body (20) of the temperature sensitive ferromagnetic material are directed toward the reed switch. At a temperature where the easy direction of magnetization is parallel to the A axes, the magnetic field from the permanent magnet (31) is directed to the reed switch (32) and closes the reed pieces thereof. On the other hand, at a temperature where the easy direction of magnetization is parallel to the basal planes (P), the reed pieces are opened due to the different direction of the magnetic field as shown in FIG. 13 B. It can again be seen that the reed pieces can be precisely opened and closed due to the reorientation of the easy direction of magnetization of the temperature control device.

Referring to FIG. 14, another temperature sensing device is shown wherein elements (25a) again represent magnets for applying a magnetic field in the control device. A deflecting plate (33) is secured rotatably around the axis of a sintered body (20) of temperature sensitive ferromagnetic material provided between magnets (25a), so that the quantity of light from a light emitting diode (LED) is made variable depending upon temperature. The light with a variable quantity from is then transmitted to the avalanche photo diode (APD), via an optical fiber (34b) connected to the avalanche photo diode (APD), where the change in the quantity of light is converted to an electric signal. In this type of device which is capable of sensing the variable light quantity as explained above, the temperature sensing is mainly based on the reorientation of the easy direction of magnetization and not on electrical means with the result that the temperature sensing is advantageously not influenced by noise and the like.

The present invention will now be explained further in detail by means of an example.

EXAMPLE

Ingots of $TbCo_5$ and $DyCo_5$ materials were roughly crushed by means of a hammer and, then, finely crushed into grains finer than 325 mesh with a jet mill. The obtained powders were compacted under the conditions of a magnetic field of 6 KOe, a compact force of 2 ton/cm$^2$ and a heating temperature of 150° C. Subsequently, the obtained green compacts were sintered in an argon atmosphere at a temperature of 1200° C. and the obtained sintered bodies of the above materials were mounted in a testing device shown in FIG. 15.

In FIG. 15, each of the sintered bodies (20) of $TbCo_5$ and $DyCo_5$ material was engaged in the hollow cylinder (22), provided with a screw (23) and a fixed index (21) by means of a holding bolt for the test piece. Each of the sintered bodies (20) and the hollow cylinder (22) were rotatably mounted on a bearing (24). A pair of magnets (25a) and (25b) were oppositely arranged outside of the parts of the testing device (20, 21, 22 and 24). The temperature of each of the sintered bodies (20) was changed by an air heater to more than approximately 150° C. and approximately 60° C. with regard to the $TbCO_5$ and $DyCO_5$, respectively. The sintered bodies (20) were reversibly rotated by an angle of 90° at a temperature increase higher than and decrease lower than the level mentioned above.

What we claim is:

1. A process according to claim 1, wherein said spin reorientation type material is a rare earth cobalt alloy material generally expressed by a formula of $RCo_5$, wherein the R component is one rare earth element selected from a group consisting of neodymium (Nd), dysprosium (Dy), and terbium (Tb) and the Co component consists of cobalt or is cobalt and an additive metal which partly replaces the cobalt.

2. A process according to claim 1, wherein said transition temperature range falls within a temperature range of from room temperature to 150° C. (425° K.).

3. A process according to claim 2, wherein the heating temperature in said heating step slightly exceeds said transition temperature range.

4. A process according to claim 3, wherein the spin reorientation type ferromagnetic material is a rare earth cobalt alloy material generally expressed by a formula of $RCo_5$, wherein the R component is one rare earth element selected from a group consisting of neodymium (Nd), dysprosium (Dy), and terbium (Tb) and the Co component consists of cobalt or is cobalt and an additive metal which partly replaces the cobalt.

* * * * *

UNITED STATES PATENT AND TRADEMARK OFFICE
CERTIFICATE OF CORRECTION

PATENT NO. : 4,347,201

DATED : August 31, 1981

INVENTOR(S) : Sagawa et al

It is certified that error appears in the above-identified patent and that said Letters Patent is hereby corrected as shown below:

```
Front page, [56] References Cited,
         After "Toulmin" insert --, Jr.--;
         After "Paladino" insert --et al.--.

Column 2, line 3, "and nei-" s/b --.  Nei---;
         line 58, ", and;" s/b --; and--;
         line 63, "C" s/b --A--.

Column 3, line 21, ", and;" s/b --; and--;
         line 22, "The heating means sur-" should begin
new paragraph;
         line 23, "rounded" s/b --rounds--;
         line 53, "." s/b --;--.

Column 4, line 13, "B is a side" should begin new paragraph;
         line 14, "C is a front" should begin new paragraph;
         line 17, ", and;" s/b --; and--;
         line 48, after "respectively" insert --,--.

Column 6, line 25, after "temperatures" insert --,--;
         line 36, after "ically" insert --,--.

Column 7, line 20, ", (1)" s/b --(1),--;
         line 24, "disc." s/b --disc, respectively.--;
         line 24, after "disc" (second occurrence) delete
", respectively";
         line 28, "subsequently" s/b --subsequent--;

Column 8, line 35, delete ",".

Column 10, line 13, after "means" insert --,--.
```

UNITED STATES PATENT AND TRADEMARK OFFICE
CERTIFICATE OF CORRECTION

PATENT NO. : 4,347,201

DATED : August 31, 1981

INVENTOR(S) : Sagawa et al

It is certified that error appears in the above-identified patent and that said Letters Patent is hereby corrected as shown below:

Claims 1 and 4 should be:

--1. A process for producing a polycrystalline temperature-sensitive ferromagnetic element comprising the steps of:

compacting fine grain powders of a spin reorientation type ferromagnetic material while applying a magnetic field and heating the fine grain powders of the spin reorientation type ferromagnetic material to a temperature higher than a transition temperature range of said material, wherein the transition temperature range of said material is room temperature or above and wherein the easy direction of magnetization of said spin reorientation type ferromagnetic material is uniformly parallel to the basal planes (P) of the grain powder crystals below the transition temperature range and the easy direction of magnetization is uniformly parallel to the A axes of the grain powder crystals above the transition temperature range; and producing from the compacted spin reorientation type ferromagnetic material a polycrystalline temperature sensitive element, in which the easy direction of magnetization is uniformly oriented and reoriented at the transition temperature range of the material,

UNITED STATES PATENT AND TRADEMARK OFFICE
CERTIFICATE OF CORRECTION

PATENT NO. : 4,347,201

DATED : August 31, 1981

INVENTOR(S) : Sagawa et al

It is certified that error appears in the above-identified patent and that said Letters Patent is hereby corrected as shown below:

said spin reorientation of the material, being a rare earth cobalt alloy material generally expressed by a formula of $RCo_5$, wherein the R component is one rare earth element selected from a group of neodymium (Nd), dysprosium (Dy), and terbium (Tb) and the Co component consists of cobalt or is cobalt and an additive metal which partly replaces the cobalt.--

--4. A process for producing a polycrystalline temperature-sensitive ferromagnetic element comprising the steps of:

(a) selecting a composition of a spin reorientation type ferromagnetic material having an easy direction of magnetization uniformly variable upon temperature for the required polycrystalline temperature-sensitive element;

(b) compacting fine grain powders of the selected spin reorientation type ferromagnetic material under pressure;

(c) applying a magnetic field to the fine grain powders of the material during compacting;

(d) heating the fine grain powders during compacting and applying the magnetic field to a temperature slightly higher than the transition temperature range of the material for uniformly orienting the direction of the magnetization of the grain powder crystals, wherein the easy direction of magnetization of the ferromagnetic material below the transition temperature range is uniformly parallel to the basal planes (P) of the grain powder crystals and wherein the easy direction of magnetization above the transition temperature range is uniformly perpendicular to the

UNITED STATES PATENT AND TRADEMARK OFFICE
CERTIFICATE OF CORRECTION

PATENT NO. : 4,347,201

DATED : August 31, 1981

INVENTOR(S) : Sagawa et al

It is certified that error appears in the above-identified patent and that said Letters Patent is hereby corrected as shown below:

basal planes in the A axes of the grain powder crystals; and (e) producing a polycrystalline temperature sensitive element from the compacted and heated spin re-orientation type ferromagnetic material in which the easy direction of magnetization is uniformly oriented and re-oriented between the basal planes (P) and (A) axes of the grain powder crystals at the predetermined transition temperature range, said spin reorientation type ferromagnetic material being a rare earth cobalt alloy material generally expressed by a formula of $RCo_5$, wherein the R component is one rare earth element selected from a group consisting of neodymium (Nd), dysprosium (Dy), and terbium (Tb) and the Co component consists of cobalt or is cobalt and an additive metal which partly replaces the cobalt.--

Signed and Sealed this

Fourth Day of December 1984

[SEAL]

Attest:

GERALD J. MOSSINGHOFF

*Attesting Officer*     *Commissioner of Patents and Trademarks*